US008732234B2

(12) United States Patent
Morse et al.

(10) Patent No.: US 8,732,234 B2
(45) Date of Patent: *May 20, 2014

(54) PROVIDING RELEVANT NON-REQUESTED CONTENT TO A MOBILE DEVICE

(75) Inventors: Jason Morse, Mountain View, CA (US); Jonathan Grubb, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 729 days.

This patent is subject to a terminal disclaimer.

(21) Appl. No.: 11/422,539

(22) Filed: Jun. 6, 2006

(65) Prior Publication Data

US 2006/0277308 A1 Dec. 7, 2006

Related U.S. Application Data

(60) Provisional application No. 60/688,122, filed on Jun. 7, 2005.

(51) Int. Cl.
*G06F 15/16* (2006.01)

(52) U.S. Cl.
USPC ........... 709/203; 709/217; 709/206; 709/219; 709/223

(58) Field of Classification Search
USPC ...................... 709/203, 217; 455/456.1, 456.3
See application file for complete search history.

(56) References Cited

U.S. PATENT DOCUMENTS

| 5,493,692 A | 2/1996 | Theimer et al. |
| 5,802,292 A | 9/1998 | Mogul |
| 5,978,841 A | 11/1999 | Berger |
| 6,023,726 A | 2/2000 | Saksena |
| 6,098,064 A | 8/2000 | Pirolli et al. |
| 6,385,641 B1 | 5/2002 | Jiang et al. |
| 6,538,668 B1 * | 3/2003 | Ruberg et al. ................. 715/747 |
| 6,834,195 B2 | 12/2004 | Brandenberg et al. |

(Continued)

FOREIGN PATENT DOCUMENTS

| JP | 2001-101060 | 4/2001 |
| JP | 2001-101061 | 4/2001 |

(Continued)

OTHER PUBLICATIONS

International Search Report and Written Opinion for International Application No. PCT/US06/22237, 9 pages.

(Continued)

*Primary Examiner* — Djenane Bayard
(74) *Attorney, Agent, or Firm* — James J. DeCarlo; Greenberg Traurig, LLP

(57) ABSTRACT

A system and method are directed towards providing non-requested content to a mobile terminal based on characteristics of, and tracked usage of the mobile terminal to request content through an online portal service, which provides access to content in multiple subject areas. A mobile user profile is created from the characteristics and patterns of the tracked usage. The tracked usage information includes the time, location, frequency at which the content was requested. Based on the mobile user profile information, content related to previously requested content is provided to the mobile terminal upon a trigger that is related to the requested content. The trigger event may include the mobile terminal returning to a location from which certain content was previously requested. The non-requested content may further be based on a related general user profile that indicates usage of an alternate electronic device to access content through the portal.

20 Claims, 7 Drawing Sheets

(56) References Cited

U.S. PATENT DOCUMENTS

| | | | |
|---|---|---|---|
| 6,868,439 B2 | 3/2005 | Basu et al. | |
| 6,947,973 B2 | 9/2005 | Shimura | |
| 6,976,090 B2 | 12/2005 | Ben-Shaul et al. | |
| 6,981,017 B1 | 12/2005 | Kasriel et al. | |
| 7,027,801 B1* | 4/2006 | Hall et al. | 455/412.1 |
| 7,130,890 B1 | 10/2006 | Kumar et al. | |
| 7,376,414 B2* | 5/2008 | Engstrom | 455/414.3 |
| 7,487,204 B2 | 2/2009 | Asthana | |
| 7,558,748 B2 | 7/2009 | Ehring et al. | |
| 7,558,822 B2 | 7/2009 | Fredricksen et al. | |
| 7,996,481 B2 | 8/2011 | Stillman | |
| 2002/0023230 A1* | 2/2002 | Bolnick et al. | 713/202 |
| 2002/0077130 A1* | 6/2002 | Owensby | 455/466 |
| 2002/0078165 A1 | 6/2002 | Genty et al. | |
| 2002/0112035 A1 | 8/2002 | Carey et al. | |
| 2003/0050058 A1 | 3/2003 | Walsh et al. | |
| 2003/0101024 A1* | 5/2003 | Adar et al. | 702/187 |
| 2003/0115318 A1 | 6/2003 | Wueste | |
| 2003/0140088 A1 | 7/2003 | Robinson et al. | |
| 2003/0187984 A1 | 10/2003 | Banavar et al. | |
| 2003/0191685 A1* | 10/2003 | Reese | 705/14 |
| 2004/0039814 A1 | 2/2004 | Crabtree et al. | |
| 2004/0088355 A1 | 5/2004 | Hagan et al. | |
| 2004/0098449 A1 | 5/2004 | Bar-Lavi et al. | |
| 2005/0097008 A1* | 5/2005 | Ehring et al. | 705/26 |
| 2005/0182742 A1* | 8/2005 | Griffin et al. | 707/1 |
| 2005/0198191 A1 | 9/2005 | Carlson et al. | |
| 2005/0261987 A1* | 11/2005 | Bezos et al. | 705/27 |
| 2006/0059225 A1 | 3/2006 | Stonehocker et al. | |
| 2006/0277271 A1 | 12/2006 | Morse et al. | |
| 2008/0200161 A1 | 8/2008 | Morse et al. | |
| 2009/0077189 A1* | 3/2009 | Requena | 709/206 |
| 2009/0299934 A1* | 12/2009 | Horvitz et al. | 706/45 |
| 2010/0287048 A1* | 11/2010 | Ramer et al. | 705/14.46 |

FOREIGN PATENT DOCUMENTS

| | | |
|---|---|---|
| JP | 2005-130294 | 5/2005 |
| WO | 01/95592 A1 | 12/2001 |
| WO | 03/077153 | 9/2003 |
| WO | 03/085560 | 10/2003 |

OTHER PUBLICATIONS

Office Communication for U.S. Appl. No. 12/111,115 mailed Dec. 22, 2010.

Klyne, G. et al., "Composite Capability/Preference Profiles (CC/PP): Structure and Vocabularies 1.0," W3C Recommendation, Jan. 15, 2004 http://www.w3.org/TR/CCPP-struct-vocab/.

Maglio, P. P. et al., "How to Build Modeling agents to Support Web Searchers," in Proceedings of the Sixth International Conference on User Modeling, Springer Wien, New York, NY, 1997.

International Search Report and Written Opinion for International Patent Application No. PCT/US2006/022236 mailed Oct. 30, 2007.

International Preliminary Report on Patentability for International Patent No. PCT/US2006/022236 mailed Dec. 27, 2007.

International Preliminary Report on Patentability for International Patent No. PCT/US2006/022237 mailed Mar. 26, 2009.

Extended Search Report for European Patent Application No. 06772512.7-2211 mailed Jun. 1, 2010.

Official Communication for Chinese Patent Application No. 200680020336.8 dated Nov. 13, 2009.

Official Communication for Chinese Patent Application No. 200680020336.8 dated Aug. 4, 2010.

Official Communication for Japanese Patent Application No. 2008-515907 dated Jun. 4, 2010.

Official Communication for Japanese Patent Application No. 2008-515907 dated Apr. 20, 2011.

Official Communication for Korean Patent Application No. 10-2007-7018131 mailed Nov. 30, 2009.

Official Communication for Korean Patent Application No. 10-2007-7018131 mailed Jul. 28, 2010.

Official Communication for Korean Patent Application No. 10-2007-7018131 mailed Nov. 8, 2010.

Official Communication for Korean Patent Application No. 10-2007-7018131 mailed Jul. 27, 2011.

Office Communication for U.S. Appl. No. 11/422,536 mailed Oct. 10, 2008.

Office Communication for U.S. Appl. No. 11/422,536 mailed Feb. 18, 2009.

Office Communication for U.S. Appl. No. 11/422,536 mailed Apr. 24, 2009.

Office Communication for U.S. Appl. No. 11/422,536 mailed Jul. 21, 2009.

Office Communication for U.S. Appl. No. 11/422,536 mailed Feb. 2, 2010.

Office Communication for U.S. Appl. No. 11/422,536 mailed Aug. 16, 2010.

Office Communication for U.S. Appl. No. 12/111,115 mailed Jul. 6, 2011.

Office Communication for U.S. Appl. No. 12/111,115 mailed Oct. 27, 2011.

Official Communication for U.S. Appl. No. 12/111,115 mailed Oct. 24, 2012.

Official Communication for U.S. Appl. No. 12/111,115 mailed Nov. 27, 2012.

Official Communication for U.S. Appl. No. 12/111,115 mailed Jan. 31, 2013.

* cited by examiner

PROVIDING RELEVANT NON-REQUESTED CONTENT TO A MOBILE DEVICE

RELATED APPLICATION

This utility patent application claims the benefit of U.S. Provisional Patent Application Ser. No. 60/688,122, filed on Jun. 7, 2005. The benefit of the earlier filing date is hereby claimed under 35 U.S.C. 119(e).

FIELD OF THE INVENTION

The present invention relates generally to mobile communications, and more particularly, but not exclusively, to providing non-requested content to mobile terminals.

BACKGROUND OF THE INVENTION

A large number of people use mobile terminals, such as cellular phones, personal digital assistants (PDAs), and the like for a wide variety of purposes. In addition to using them for personal communication, many users access text, audio, visual, and other content via wireless and/or wired networks. Access to some content can be somewhat difficult as a result of limitations of the mobile terminals, communication bandwidth, and/or other factors. It is also sometimes difficult and time consuming to access content that is most relevant to a particular user without first wading through less relevant content.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, the present invention is directed towards providing non-requested content to a mobile device.

Illustrative Operating Environment

Figure 1:
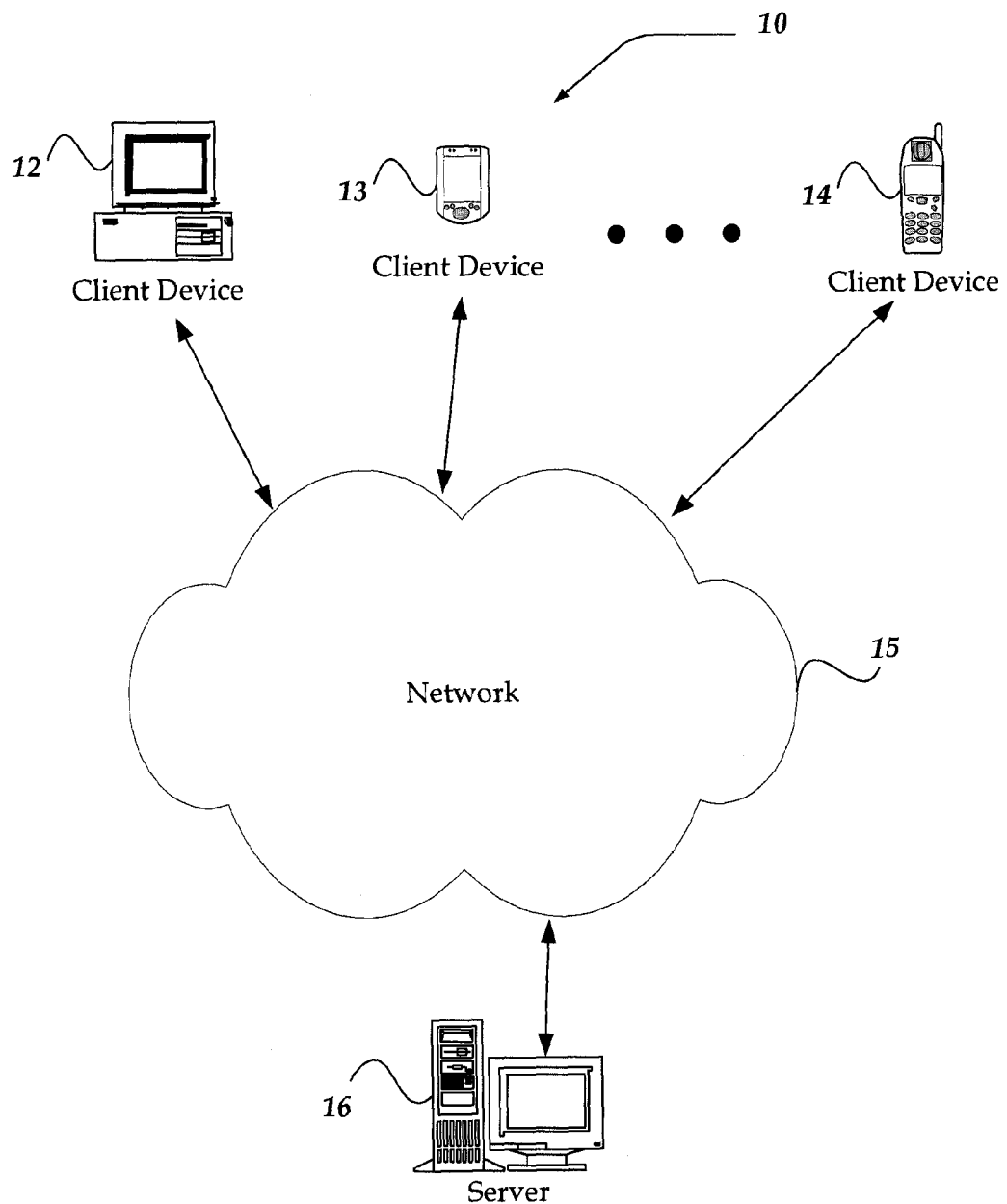
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, and a server 16. Network 15 is in communication with and enables communication between each of client devices 12-14, and server 16.

Client devices 12-14 may include virtually any computing device capable of receiving and sending a message over a network, such as network 15, to and from another computing device, such as server 16, each other, and the like. The set of such devices described in an exemplary embodiment below generally includes mobile terminals that are usually considered more specialized devices with limited capabilities and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to control settings, and to instruct the client device to perform operations. Each client device also includes a communication interface that enables the client device to send and receive messages from another computing device employing the same or a different communication means, including, but not limited to SMS, MMS, IM, internet relay chat (IRC), Mardam-Bey's internet relay chat (mIRC), Jabber, email, and the like. Client devices 12-14 may be further configured with a browser application that is configured to receive and to send markup pages, web-based messages, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 15 is configured to couple one computing device to another computing device to enable them to communicate.

Network 15 is enabled to employ any form of medium for communicating information from one electronic device to another. Also, network 15 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 15 includes any communication method by which information may travel between client devices 12-14, and server 16. Network 15 is constructed for use with various communication protocols including wireless application protocol (WAP), transmission control protocol/internet protocol (TCP/IP), code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

Figure 2:
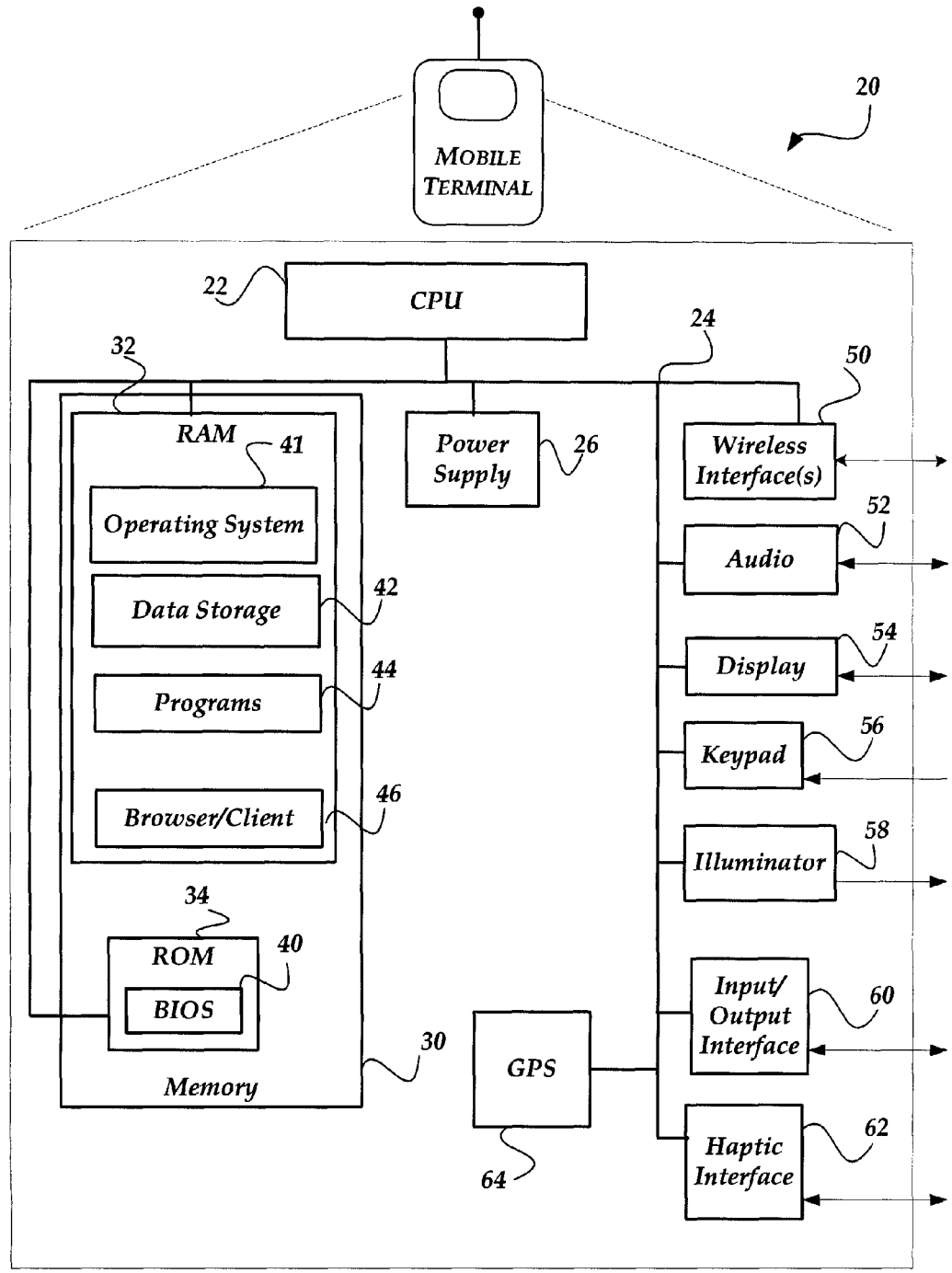
FIG. 2 shows one embodiment of a mobile terminal device that may be included in a system implementing the invention.

FIG. 2 shows an exemplary mobile terminal 20, according to one embodiment of the invention. In one embodiment, mobile terminal 20 is a cellular telephone that is arranged to send and receive voice communications and messages such as SMS messages via one or more wireless communication interfaces. Generally, mobile terminal 20 may comprise any personally mobile electronic device. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Such devices include cellular telephones, smart phones, pagers, radio frequency (RF) devices, infrared (IR) devices, integrated devices combining one or more of the preceding devices, and the like. Mobile terminal 50 may also comprise other electronic devices that such as Personal Digital Assistants (PDAs), handheld computers, personal computers, multiprocessor systems, microprocessor-based or programmable consumer electronics, network PCs, wearable computers, and the like.

Mobile terminal 20 may include many more components than those shown in FIG. 2. However, the components shown are sufficient to disclose an illustrative embodiment for practicing the present invention. As shown in the figure, mobile terminal 20 includes a processing unit 22 in communication with a mass memory 30 via a bus 24.

Mass memory 30 includes a RAM 32, a ROM 34, and other storage means. Mass memory 30 illustrates another example of computer storage media for storage of information such as computer readable instructions, data structures, program modules or other data. Mass memory 30 stores a basic input/output system ("BIOS") 40 for controlling low-level operation of mobile terminal 20. The mass memory also stores an operating system 41 for controlling the operation of mobile terminal 20. It will be appreciated that this component may include a general purpose operating system such as a version of UNIX, or LINUX™, or a specialized mobile communication operating system such as Windows Mobile™, or the Symbian® operating system. The operating system may include, or interface with a Java virtual machine module that enables control of hardware components and/or operating system operations via Java application programs.

Memory 30 further includes one or more data storage units 42, which can be utilized by mobile terminal 20 to store, among other things, programs 44 and/or other data. Programs 44 may include computer executable instructions which, when executed by mobile terminal 20, transmit, receive, and/or otherwise process messages (e.g., SMS, MMS, IM, email, and/or other messages), audio, video, and enable telecommunication with another user of another mobile device. Other examples of application programs include calendars, contact managers, task managers, transcoders, database programs, word processing programs, spreadsheet programs, games, and so forth. In addition, mass memory 30 stores a browser program 46. Browser 46 may include computer executable instructions, which may be run under control of operating system 41 to enable and manage requesting, receiving, and rendering markup pages such as WAP pages (sometimes referred to as WAP cards), and the like.

Mobile terminal 20 also includes a power supply 26, one or more wireless interfaces 50, an audio interface 52, a display 54, a keypad 56, an illuminator 58, an input/output interface 60, a haptic interface 62, and an optional global positioning systems (GPS) receiver 64. Power supply 26 provides power to mobile terminal 20. A rechargeable or non-rechargeable battery may be used to provide power. The power may also be provided by an external power source, such as an AC adapter or a powered docking cradle that supplements and/or recharges a battery.

Mobile terminal 20 may optionally communicate with a base station (not shown), or directly with another mobile device. Wireless interface 50 includes circuitry for coupling mobile terminal 20 to one or more wireless networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), and the like.

Audio interface 52 is arranged to produce and receive audio signals such as the sound of a human voice. For example, audio interface 52 may be coupled to a speaker and microphone (not shown) to enable telecommunication with others and/or generate an audio acknowledgement for some action. Display 54 may be a liquid crystal display (LCD), gas plasma, light emitting diode (LED), or any other type of display used with a mobile device. Display 54 may also include a touch sensitive screen arranged to receive input from an object such as a stylus or a digit from a human hand.

Keypad 56 may comprise any input device arranged to receive input from a user. For example, keypad 56 may include a push button numeric dial, or a keyboard. Keypad 56 may also include command buttons that are associated with selecting and sending images. Illuminator 58 may provide a status indication and/or provide light. Illuminator 58 may remain active for specific periods of time or in response to events. For example, when illuminator 58 is active, it may backlight the buttons on keypad 56 and stay on while the mobile device is powered. Also, illuminator 58 may backlight these buttons in various patterns when particular actions are performed, such as dialing another mobile device. Illuminator 58 may also cause light sources positioned within a transparent or translucent case of the mobile device to illuminate in response to actions.

Mobile terminal 20 also comprises input/output interface 60 for communicating with external devices, such as a headset, or other input or output devices not shown in FIG. 2. Input/output interface 60 can utilize one or more communication technologies, such as USB, infrared, Bluetooth™, and the like. Haptic interface 62 is arranged to provide tactile feedback to a user of the mobile terminal. For example, the haptic interface may be employed to vibrate mobile terminal 50 in a particular way when another user of a mobile device is calling.

Optional GPS transceiver 64 can determine the physical coordinates of mobile terminal 20 on the surface of the Earth, which typically outputs a location as latitude and longitude values. GPS transceiver 64 can also employ other geo-positioning mechanisms, including, but not limited to, triangulation, assisted GPS (AGPS), E-OTD, CI, SAI, ETA, BSS and the like, to further determine the physical location of mobile terminal 20 on the surface of the Earth. It is understood that under different conditions, GPS transceiver 64 can determine a physical location within millimeters for mobile terminal 20; and in other cases, the determined physical location may be less precise, such as within a meter or significantly greater distances.

Mobile terminal 20 may communicate with a server to request and receive markup pages and/or for other services. One embodiment of a general purpose server computing device, such as a server device 70, is described in more detail below in conjunction with FIG. 3. Briefly, server device 70 may include any computing device capable of connecting to network 15 to receive and provide services and information to client devices and/or other computing devices. Server device 70 may include many more components than those shown. The components shown, however, are sufficient to disclose an illustrative embodiment for practicing the invention. Many of the components of server device 70 may also be duplicated in a higher capability client device that a mobile use may use for browsing web pages and/or other computing activities, in addition to using the mobile terminal.

As shown in the figure, server device 70 includes a processing unit 72 in communication with a mass memory 74 via a bus 73. Mass memory 74 generally includes a RAM 76, a ROM 78, and other storage means. Mass memory 74 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 74 stores a basic input/output system ("BIOS") 80 for controlling low-level operation of server device 70. The mass memory also stores an operating system 81 for controlling the operation of server device 70. It will be appreciated that this component may include a general purpose operating system such as a version of Windows™, UNIX, LINUX™, Solaris™, or the like. The operating system may also include, or interface with a Java virtual machine module that enables control of hardware components and/or operating system operations via Java application programs.

Mass memory 74 further includes one or more data storage units 82, which can be utilized by server device 70 to store, among other things, programs 84 and/or other data. Programs 84 may include computer executable instructions which can be executed by server device 70 to implement a markup handler application, such as a WAP handler application for transmitting, receiving, and otherwise processing WAP communications, an HTTP handler application for transmitting, receiving, and otherwise processing HTTP communications, and the like. Similarly, programs 84 can include a secure socket layer (SSL) handler application for handling secure connections, such as initiating communication with an external application in a secure fashion. Other examples of application programs include messaging applications, schedulers, calendars, web services, transcoders, database programs, word processing programs, spreadsheet programs, and so forth. Accordingly, programs 84 can process markup pages, audio, video, enable telecommunication with another user of another electronic device, and other services.

In addition, mass memory 74 stores a profiling module 86 and a prefetching module 88. Profiling module 86 may include computer executable instructions, which may be run under control of operating system 81 to enable collection and analysis of usage information. Similarly, server device 70 can include a prefetching module 88, which may further access and buffer information that may be of interest to the users of client devices.

Figure 3:
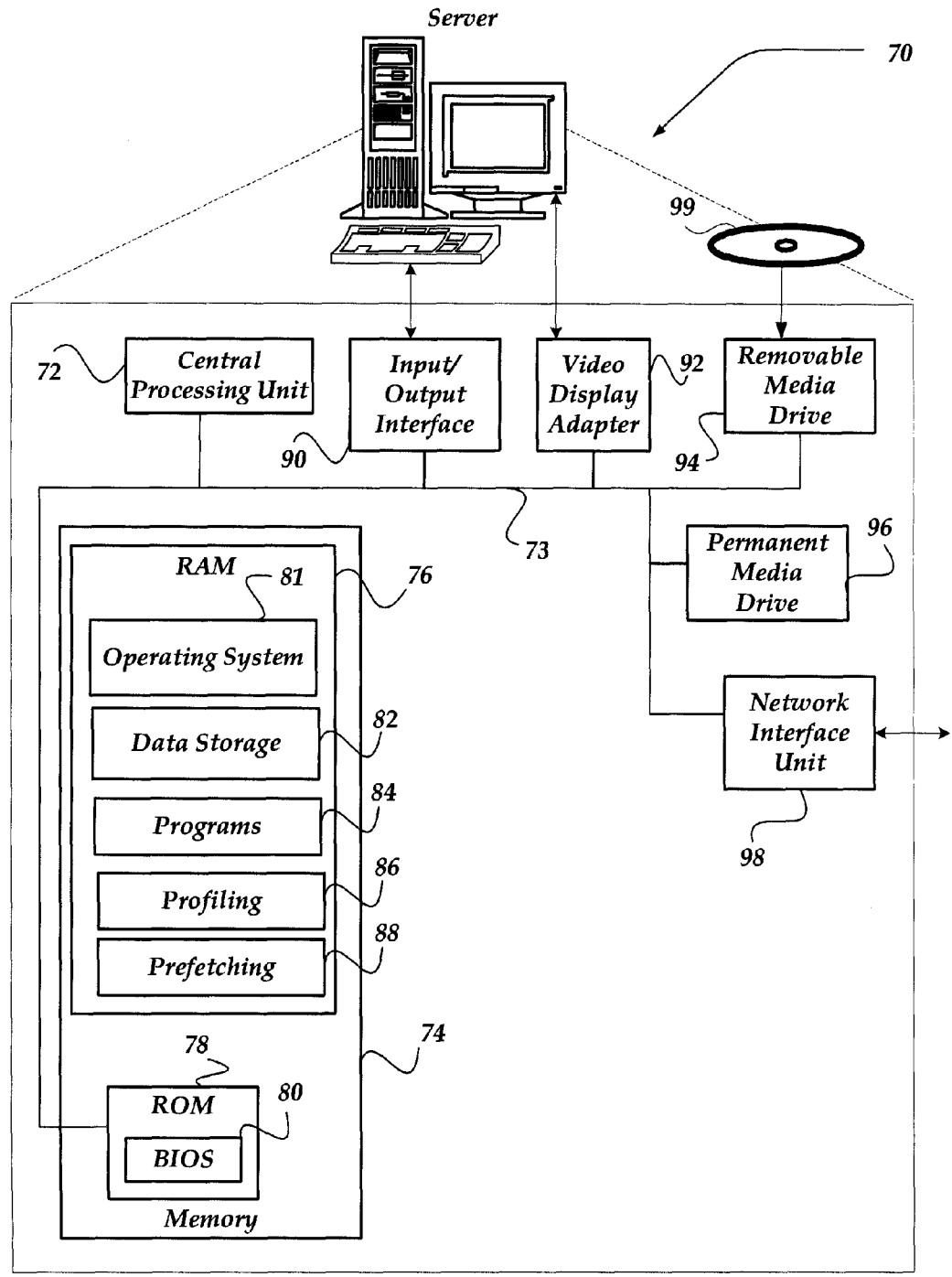
FIG. 3 shows one embodiment of a server device that may be included in a system implementing the invention.

Server device 70 also includes an input/output interface 90 for communicating with input/output devices such as a keyboard, mouse, wheel, joy stick, rocker switches, keypad, printer, scanner, and/or other input devices not specifically shown in FIG. 3. A user of server device 70 can use input/output devices to interact with a user interface that may be separate or integrated with operating system 81, programs 84, and/or other modules. Interaction with the user interface includes visual interaction via a display, and a video display adapter 92.

Server device 70 may include a removable media drive 94 and/or a permanent media drive 96 for computer-readable storage media. Removable media drive 94 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 99, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 98, server device 70 can communicate with a wide area network such as the Internet, a local area network, a wired telephone network, a cellular telephone network, or some other communications network, such as network 15 in FIG. 1. Network communication interface unit 98 is sometimes known as a transceiver, transceiving device, network interface card (NIC), and the like.

Illustrative Architecture

Figure 4:
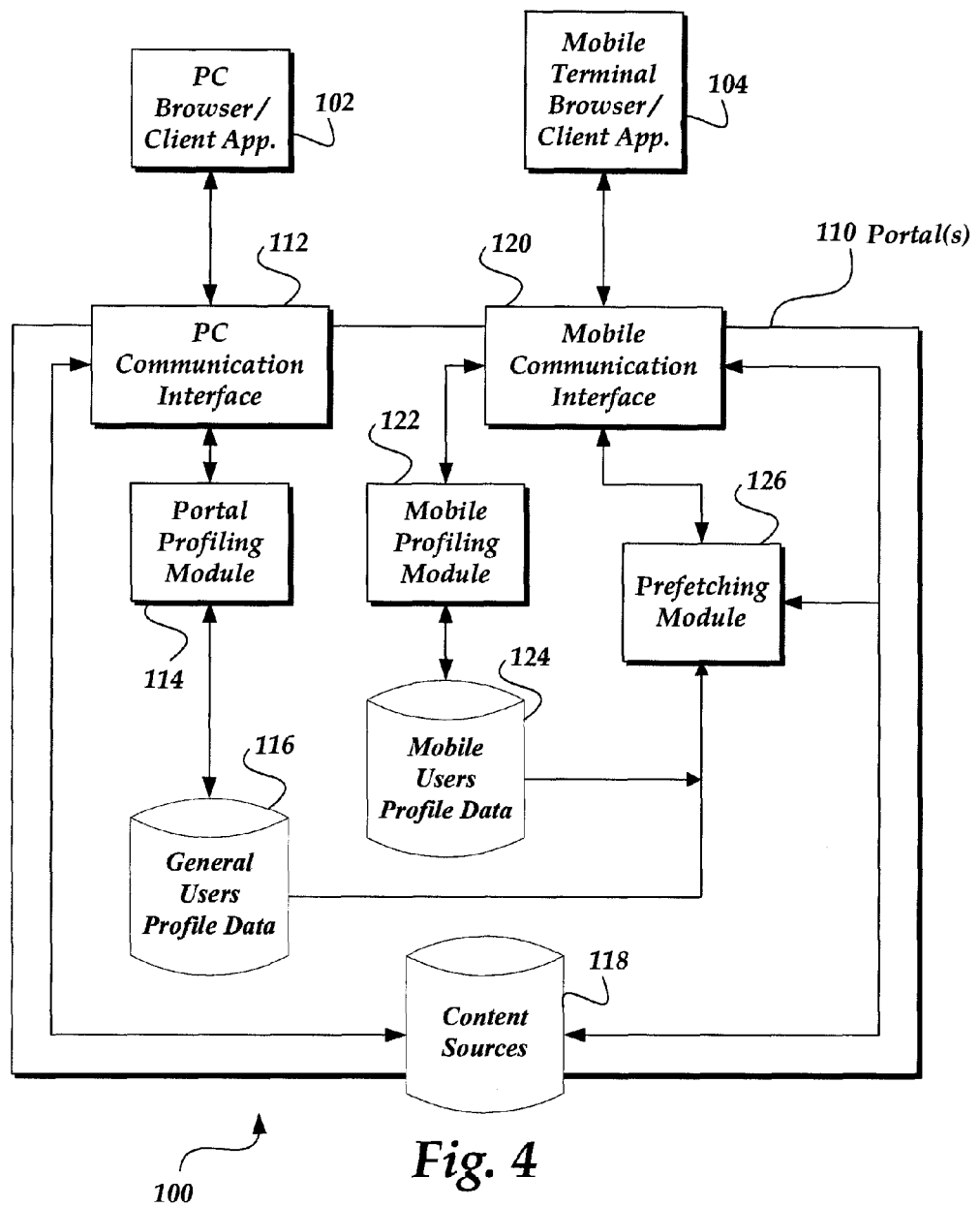
FIG. 4 illustrates a sample architecture 100 for use in one embodiment of the invention.

FIG. 4 illustrates a sample architecture 100 for use in one embodiment of the invention. This embodiment is described in terms of a mobile terminal browser 104 (and/or other mobile client) communicating with one or more portal services 110 that maintain one or more user profiles and provide portal services, although the invention is not so limited. Portal service 110 will generally provide an aggregate source for a wide variety of content subjects such as news, economic information and services, messaging services, online search services, entertainment services, social interaction services, and the like. A higher order client such as a PC browser 102 (and/or other PC client) may also communicate with portal 110 and/or another portal in communication with portal 110. PC browser 102 may communicate through a PC communication interface 112 that may be part of, or coupled to portal 110. PC communication interface 112 may assist in accessing web pages and/or other content from one or more content sources 118, which may be part of, or accessible by portal 110. PC communication interface 112 may also interact with a portal profiling module 114, which tracks and evaluates a user's browsing actions to develop a general user profile. General user profiles may be stored in a general users profile database 116.

Similarly, mobile terminal browser 104 may communicate through a mobile communication interface 120 that may be part of, or coupled to portal 110. Mobile communication interface 120 may assist in accessing WAP pages and/or other content from one or more content sources 118. Mobile communication interface 120 interacts with a mobile profiling module 122, which tracks and evaluates a mobile user's browsing actions on a mobile terminal to develop a mobile user profile. Mobile user profiles may be stored in a mobile users profile database 124.

A prefetching module 126 also accesses mobile users profile database 124 to determine and cache content from content sources 118 that a mobile user may soon desire, based on characteristics of the mobile terminal, the mobile user's past browsing actions, the user's corresponding general user profile, and/or other information. Prefetching module 126 may also use the mobile user profile and/or the user's general user profile stored in general users profile database 116 to help determine content that the mobile user may soon desire. Prefetched content may be cached by portal 110, by a network carrier, by the user's mobile terminal, and/or other service.

Illustrative Processes

Figure 5:
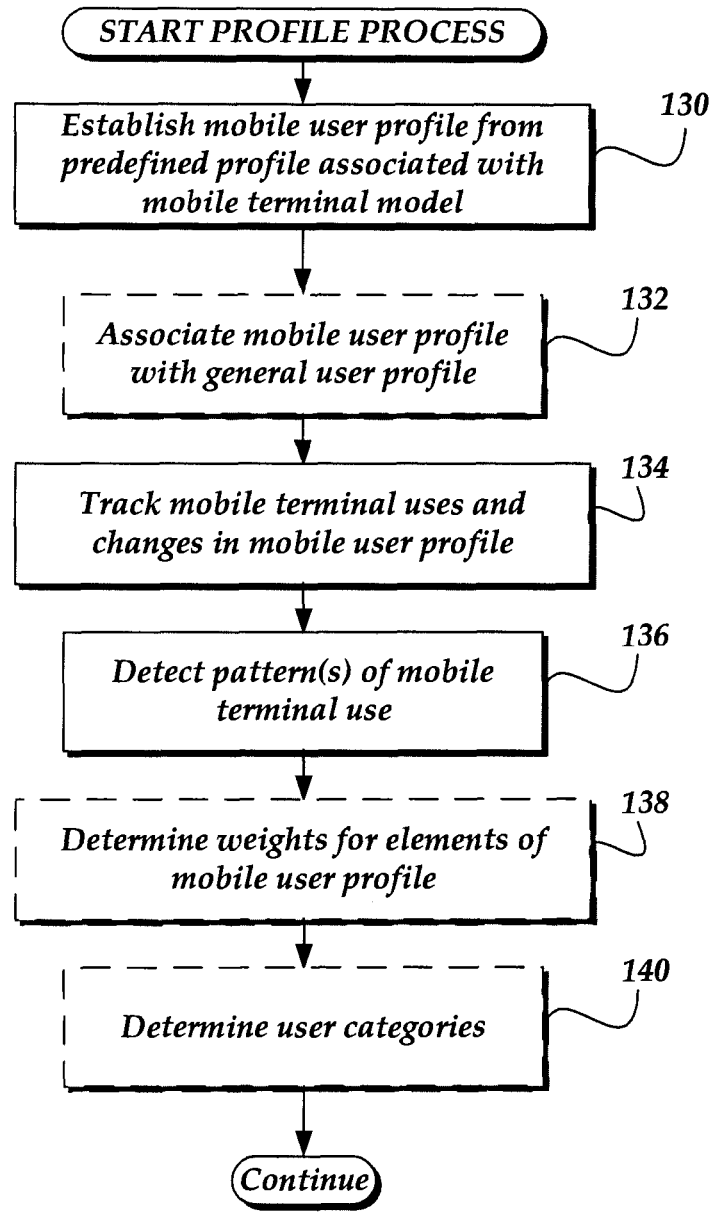
FIG. 5 illustrates logic of one embodiment for producing a mobile user profile.

FIG. 5 illustrates logic of one embodiment for producing a mobile user profile. When a mobile terminal initially communicates with the portal service, the service establishes a mobile user profile, at an operation 130. Communication with the mobile terminal provides some basic information to the portal server, including a device model number, a carrier identifier, a mobile identification number (MIN), and the like. The MIN is often a telephone number, a Mobile Subscriber Integrated Services Digital Network (MS-ISDN), an electronic serial number (ESN), or other mobile terminal identifier. The portal service uses the basic information to access other information regarding the mobile terminal from the mobile terminal manufacturer, distributor, trade group, and/or other sources.

The mobile user profile can be based on a standardized user agent profile, such as that defined by the User Agent Profile Specification available from the Wireless Application Protocol Forum, Ltd. (www.wapforum.org). Another example of obtaining information about a mobile terminal includes using Composite Capability/Preference Profiles (CC/PP), defined by the World Wide Web Consortium (www.w3c.org). Further examples of profiles describing mobile terminal capabilities include a mobile information device profile (MIDP), a wireless universal resource file (WURFL), and the like. A user agent profile or other standardized profile generally includes attributes of the mobile terminal, such as a screen size, a screen resolution, a memory size, and the like. A sample user agent profile is provided in Appendix A. The server can use a user agent profile or other standardized profile to start a mobile user profile, which is then modified with alternate and/or additional information.

For example, the portal service may initially modify the mobile user profile to add information about capabilities, services, contractual agreements, and/or limitations of the mobile user's carrier and/or service plan. For instance, the portal service may use outside sources or out-band-communications to determine that the user's carrier offers online photo management to subscribers of certain service plans. If the portal service determines that the mobile user subscribes to one of those certain plans, that information can be stored in the mobile user profile.

At an optional operation 132, the server can associate the mobile user profile with a general user profile that the user may already have established with the portal service. The user may already have a portal account through a network connection with a general purpose computing device (e.g. a PC), an entertainment system, another mobile device, and the like. The association of profiles can take multiple forms. For example, the mobile user profile may form the basis of the general user profile. Alternatively, the elements of a mobile user profile may be added to an existing general user profile. Conversely, the mobile user profile may remain separate from, but linked to the general user profile. Other associations are also possible. If the mobile user is not registered with the portal service, the mobile user profile may stand alone, and be identified by the mobile terminal identifier.

With the mobile user's permission, the portal service tracks browsing activities, purchasing activities, locations, and other actions of the mobile user at an operation 134. For example, the portal service may log content that the mobile user requests, web sites that the mobile user accesses, when the mobile user accesses those sites, and the geographic location at which the mobile user accesses those sites. The portal service may also log indirect information, such as the season of the year in which the mobile user accesses certain sites, the weather conditions on days that the mobile user accesses certain sites, and the like. The portal service may further track the mobile user's online purchases through the mobile terminal and/or through the mobile user's corresponding portal account with general purpose computing devices. Based on latitude and longitude information, the portal service can also determine and store related information, such as merchants that are near locations at which the user frequently uses the mobile terminal. The portal service may inform those merchants, who may wish to purchase the opportunity to provide advertisements or other content to the mobile user, especially the next time that the mobile terminal is detected near the merchant locations, or around the time that the mobile user is expected to be near the merchant locations, based on the mobile user's movement and/or usage habits.

In addition, the portal service may track characteristics of and/or changes to the mobile terminal. For example, the mobile user may purchase a different, and/or an additional mobile device. When the mobile user accesses the portal service with a new mobile device, the portal service can ask, or otherwise determine, whether the mobile user already has an existing mobile user profile and/or general user profile to which the new mobile device can be associated. For example, if the mobile user uses the same telephone number with a new mobile device (and/or a new mobile carrier), the portal service can access the mobile user profile associated with that telephone number. The portal service can also access a new user agent profile to obtain information about the new mobile device, and access carrier information associated with the new mobile device (and/or the new mobile carrier). The new information can be added to the existing mobile user profile, or a separate mobile user profile can be associated with the original mobile user profile and/or a corresponding general user profile.

The mobile user profile may also be changed based on independent testing of the mobile device, information provided in communication headers, analysis of communication performance, and other information. For example, the user agent profile may indicate that a particular mobile device includes certain capabilities. However, independent testing of that mobile device by the portal service and/or other services, may indicate greater or lesser actual performance of the mobile device. Thus, the mobile user profile can be modified to reflect the tested capabilities. Also, the mobile profiling module may evaluate the header of communications between the mobile terminal and the portal service. A sample header is provided in Appendix B. In addition to identifying the make, model, MIN, screen size, and other information about the mobile terminal, the header may indicate, or be used to determine, communication speed, throughput, and/or other communication characteristics. The communication characteristics can be averaged and/or otherwise evaluated to determine such things as the conditions at those times that the user most often uses the mobile terminal.

Based on the tracked information, the portal service may detect one or more patterns, habits, characteristics, and/or other information, at an operation 136. For example, the portal service may note that the mobile user regularly checks a certain financial web site for a certain set of company stock quotes, while at a certain location every week. The portal service may note that the mobile user regularly checks the weather and local news of a remote city, and sometimes checks flight prices to that city. The portal service may further note that the mobile user purchases a new, high performance mobile device every six months. The portal service can also determine and store related information, such as pricing information of mobile devices that the user has purchased, the carrier plans and features to which the user has subscribed, third party products and services purchased by the mobile user for use with the user's mobile device(s), products and services that are similar products and services to those the user has purchased, and the like. In conjunction with the portal service, some or all of the tracking and pattern detection operations can be performed by server software modules of the portal service and/or a client software module running on the mobile terminal.

From the patterns, the portal service can determine weights for elements of the mobile user profile at an optional operation 138. For example, the portal service may apply higher weights to elements that indicate interest in financial investments and technical gadgets. The patterns and/or weights can be used at an optional operation 140 to determine one or more general and/or consumer categories that describe the mobile user, such as a sophisticated technology user, a socially active person, a job seeker, a family-focused person, a frequent gamer, a bargain hunter, and the like. Indicators of the categories may be stored in the mobile user profile. The portal service can then use the patterns, weights, and/or categories to predict and/or prefetch content and/or services that the mobile user regularly desires and/or that may interest the mobile user.

Figure 6:
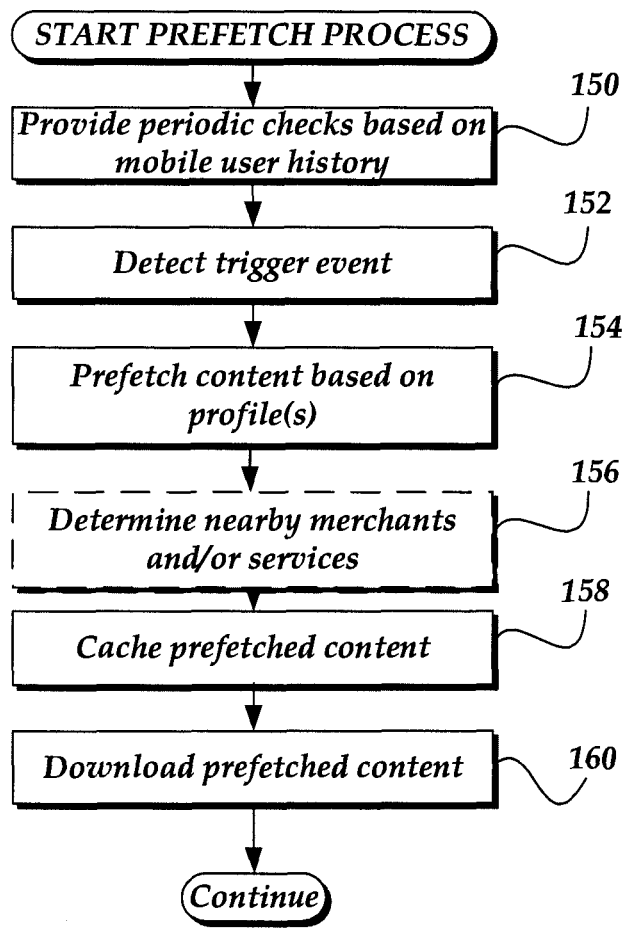
FIG. 6 illustrates logic of one embodiment for prefetching content based on the mobile user profile.

FIG. 6 illustrates logic of one embodiment for prefetching content based on the mobile user profile. The discussion of FIG. 6 generally refers to types of content requested by the mobile user, but the invention is not so limited. At an operation 150, the portal service uses history information stored in the mobile user profile to determine when periodic checks for content should be performed. For example, the mobile user profile may indicate that the mobile user checks a sports news service for a certain team on the morning after each game that the team plays. The mobile user profile would indicate a correlation between the sports news service, the team, the time of day, the schedule of the team, and/or other relationships. The mobile user profile can be modified to instruct the portal service to prefetch the current news for that sports team each morning after a scheduled game, but a short time before the user historically requests that sports news. The mobile user profile may also indicate that the user usually has to navigate though a number of web pages before getting to the desired team news page. In addition to providing scheduled prefetching, the portal service can add a link directly to the team news page into the mobile user profile, or instruct the mobile terminal to add this link to the mobile user's browser bookmark list, so that the mobile user can avoid the extra navigation steps.

In addition, or alternatively, the portal service can detect a trigger event at an operation 152, based on information in the mobile user profile. For instance, the portal service may detect that the mobile terminal is moving toward a location at which the mobile user frequently searches for current movie listings at a couple of nearby theatres. The mobile user profile may further indicate that the user purchases tickets through the mobile terminal from one of the theatres more often than other theatres. Accordingly, the frequently selected theatre may have a higher weight associated with it than other theatres. Conversely, the portal service may provide this information to the competing theatres, which may wish to purchase a higher weighting and/or another indication in the mobile user profile. Other trigger events include detecting communication with another user with which the mobile user often soon after begins playing an online game; detecting alerts associated with the mobile user's corresponding general user profile; detecting news events that may relate to the mobile user's interests as determined from data in the mobile user profile; and virtually any other events.

In any case, the portal service can use the information in the mobile user profile and/or a general user profile to prefetch content at an operation 154. The prefetched content may be content that is similar to content that the mobile user previously requested. For example, the prefetched similar content may be an update of previously requested content, a current version of previously requested content, the exact same content that was previously requested, content from the same source, and the like. The prefetching may include performing a database query, a web search, an analysis of data, or other background processing. The prefetching may also include predicting content that the most likely to be interested in, based on weighting and/or other information in the user's profile(s). For example, if a prefetch is related to the mobile user's location, the portal service may search for nearby merchants, restaurants, theatres, pubs, and the like at an optional operation 156, and prioritize the results based on the user's history of content requests while near that location. The prefetched content is cached at an operation 158. The cached content may be stored on servers of the portal service, of the communication carrier, of service providers, and/or on the mobile device. For example, prefetched sports news could be cached for faster access if/when the user requests the news.

The prefetched content can then be downloaded to the mobile terminal at an operation 160. The download can be part of the prefetching operation such that prefetched content is stored in the mobile terminal. This compensates for latency in communicating over limited-band communication channels and provides for very fast access by the mobile user if/when the user requests the content. A mobile client software module may control downloading and/or other background processing of the prefetched content to manage limited memory resources of the mobile terminal and further minimize the time between the user's request and display of the content. If the prefetched content is cached on a server, the prefetched content is generally not downloaded until requested by the mobile user.

Figure 7:
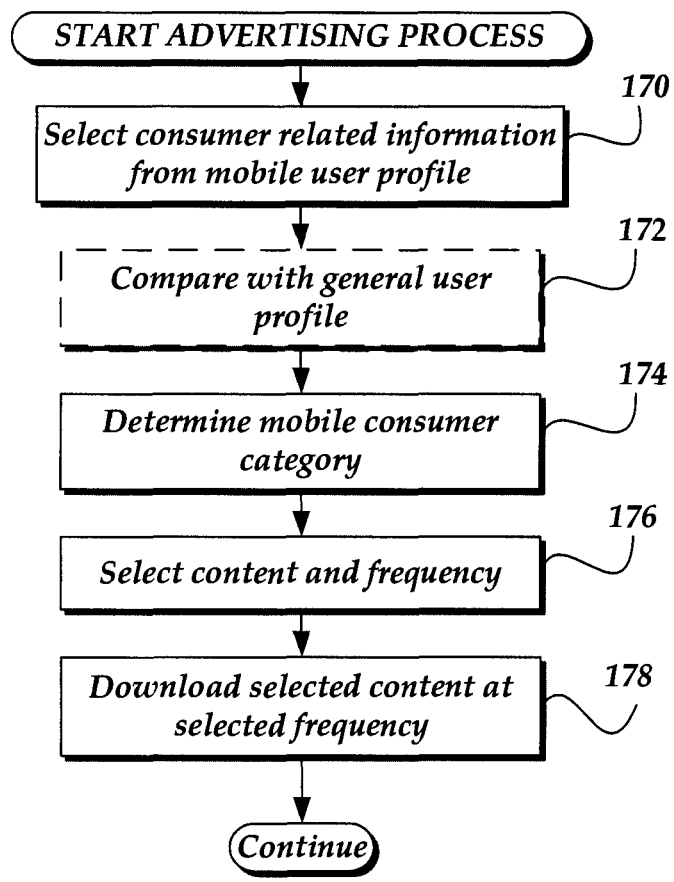
FIG. 7 is a flow diagram illustrating exemplary logic for providing non-requested information to the mobile user.

In addition to anticipating and caching content that the mobile user is likely to request, the portal service can provide content that the user has not requested, but is likely to be of interest to the mobile user. FIG. 7 is a flow diagram illustrating exemplary logic for providing non-requested information to the mobile user. Non-requested information can include advertisements, notices of government events, performing arts schedules, and the like. The following embodiment is discussed in terms of providing advertisements and/or other consumer information, but the invention is not so limited.

At an operation 170, the portal service, a marketing service, or other consumer service selects consumer related information from the mobile user profile. For example, the consumer service may select or determine the type(s) of mobile terminals that the user has purchased and/or a frequency of mobile terminal purchases. The consumer related information may also include the carrier(s), service plan features and/or price(s), mobile terminal price(s), and the like. Further consumer information may include the user's history of purchases made through the mobile terminal(s), the location of purchases, the time of purchases, the season purchases, and the like.

At an optional operation 172, the consumer service may compare the consumer related information from the mobile user profile with consumer related information stored in a general user profile. The general user profile may be that of the same mobile user, an aggregated model user, or other source. The consumer service can use the comparison to determine differences in purchasing habits through the mobile terminal and through other means. Differences may also be detected between the mobile user and other mobile users.

The information may be used to determine a mobile "consumer" category (or consumer profile) at an operation 174. This may be different from or related to the "user" category, or categories, optionally determined at operation 140 of FIG. 5. For example, a mobile user may be categorized as a high-tech purchaser, a bargain hunter, a multi-player mobile gamer, a person who frequents night clubs or movies, a live concert patron, a frequent purchaser of outdoor equipment, and the like. To determine mobile consumer categories, a set of rules and/or criteria may be applied to the data of the mobile user profile.

Based on the determined mobile consumer categories into which a particular mobile user falls, and/or based on other information in the mobile user profile, the consumer service may select content, and a frequency for serving that content, at an operation 176. For example, a high-tech purchaser that has purchased a new mobile terminal approximately every six months may benefit from advertisements for the latest technology mobile terminals and accessories during the month before the mobile user's usual six-month purchase. As another example, a mobile user that frequently purchases movie tickets on Friday nights during the summer season may benefit from a listing of current showings on Friday afternoons during summer for theatres that the mobile user typically attends. The listing of showings may be accompanied by a list of special dinner offers at restaurants near each theatre. The content may be prefetched at a particular time on Friday afternoon and/or upon a trigger event, such as the mobile user's search for theatres in an online directory.

The content may be provided to the user's mobile terminal and/or the user's PC at differing times and/or in different formats, at an operation 178. Prefetched content may be cached for download at a trigger event, at a predefined time, and/or upon user request. Some or all of the searching and prefetching may be done the portal service and/or by a background client on the mobile terminal. Although the prefetched content may not be directly requested by the user, the content may prove very valuable to the mobile user by reducing the amount of individual searching needed or eliminating the need for the user to initiate a search at all. The non-requested content may also benefit the mobile user by prefetching the content to reduce the time needed for requesting and downloading the content. A variety of other benefits may result.

The above specification, examples, and data provide a complete description of the manufacture and use of the composition of the invention. Since many embodiments of the invention can be made without departing from the spirit and scope of the invention, the invention resides in the claims hereinafter appended.

APPENDIX A

Sample User Agent Profile

| APPENDIX A | |
|---|---|
| Sample User Agent Profile | |
| HardwarePlatform | |
| Vendor | SAMSUNG |
| Model | SPH-A800 |
| CPU | ARM9 |
| ScreenSize | 240 × 320 |

APPENDIX A-continued

Sample User Agent Profile

| | |
|---|---|
| ColorCapable | Yes |
| BitsPerPixel | 16 |
| PixelAspectRatio | 1 × 1 |
| ImageCapable | Yes |
| ScreenSizeChar | 16 × 9 |
| StandardFontProportional | Yes |
| OutputCharSet | ISO-8859-1 |
| | US-ASCII |
| | UTF-8 |
| | UTF-16 |
| | UTF-16 |
| InputCharSet | ISO-8859-1 |
| | US-ASCII |
| | UTF-8 |
| TextInputCapable | Yes |
| Keyboard | PhoneKeypad |
| NumberOfSoftKeys | 2 |
| SoundOutputCapable | Yes |
| VoiceInputCapable | Yes |
| SoftwarePlatform | |
| AcceptDownloadableSoftware | Yes |
| DownloadableSoftwareSupport | application/java-archive |
| SoftwareNumber | YB24 |
| OSName | Rex |
| OSVendor | QUALCOMM |
| OSVersion | MSS6100/5.2 |
| JavaEnabled | Yes |
| JavaPlatform | MIDP-2.0 |
| | SPRINTPCS-2.0 |
| JVMVersion | SunKVM/1.1 |
| CcppAccept | text/vnd.wap.wml |
| | application/vnd.wap.wmlc |
| | application/xhtml+xml |
| | application/vnd.wap.wmlc |
| | application/vnd.wap.wbxml |
| | application/vnd.wap.wmlscriptc |
| | text/css |
| | image/vnd.wap.wbmp |
| | image/jpeg |
| | image/png |
| | image/gif |
| | audio/midi |
| | audio/mp3 |
| | audio/vnd.qcelp |
| | application/x-pmd |
| | video/x-ls-mjpg |
| | audio/mp4 |
| | audio/mp4a-latm |
| | video/mp4v-es |
| | video/mp4 |
| | video/3gpp2 |
| | video/3gpp |
| | audio/3gpp2 |
| | audio/3gpp |
| | audio/qcelp |
| | audio/amr |
| | text/vnd.sun.j2me.app-descriptor |
| | text/x-pcs-gcd |
| | application/x-pcs-mcd+xml |
| | application/sdp |
| | application/x-pmd |
| CcppAccept-Charset | ISO-8859-1 |
| | US-ASCII |
| | UTF-8 |
| | UTF-16 |
| CcppAccept-Language | en-us |
| NetworkCharacteristics | |
| SecuritySupport | SSL-3.0 |
| | TLS-1.0 |
| SupportedBearers | IPv4 |
| BrowserUA | |
| BrowserName | AU System |
| BrowserVersion | AU-MIC/2.0 MMP/2.0 |
| FramesCapable | No |
| TablesCapable | Yes |
| PreferenceForFrames | No |
| DownloadableBrowserApps | No |
| JavaAppletEnabled | No |
| JavaScriptEnabled | No |
| XhtmlVersion | XHTML-Basic/1.0 |
| WapCharacteristics | |
| WapDeviceClass | A |
| WapVersion | 2.0 |
| WmlVersion | 1.1 |
| | 1.2 |
| WmlDeckSize | 64000 |
| PushCharacteristics | |
| Push-Accept | application/wml+xmltext/html |
| Push-Accept-Encoding | base64 |
| | quoted-printable |
| Push-Accept-AppID | x-wap-application:wml.ua* |
| Push-MsgSize | 1400 |
| SprintExtensions | |
| MultimediaPlaybackSupport | YES |
| MultimediaStreamingSupport | YES |
| MultimediaEncodingSupport | YES |
| MultimediaPlayer | Qualcomm QTV/4.4.2 |
| MultimediaEncoder | Qualcomm QCamcorder/1.6 |
| MultimediaEncoderDisplaySize | 176 × 144 |
| MultimediaFileFormatForDecoder | MP4 |
| | 3gp |
| | 3g2 |
| | M4A |
| | MP3 |
| | AAC |
| MultimediaFileFormatForEncoder | 3g2 |
| | 3gp |
| MultimediaVideoDisplaySize | 176 × 144 |
| | 128 × 96 |
| MultimediaMaximumFrameRateForPlayback | 25 fps |
| MultimediaMaximumFrameRateForStreaming | 15 fps |
| MultimediaMaximumFrameRateForEncoding | 15 fps |
| MultimediaMaximumBitRateForPlayback | 128 kbps |
| MultimediaMaximumBitRateForStreaming | 128 kbps |
| MultimediaMaximumBitRateForEncoding | 100 kbps |
| VideoCodecsForDecoding | MPEG-4 Level 0, 1, and Level 2 H.263 Profile 0 and Level 10 |
| VideoCodecsForEncoding | Mpeg4 Level 0 and 1 |
| AudioCodecsForDecoding | QCELP |
| | AAC |
| | AMR-NB |
| | aacPlus |
| AudioCodecsForEncoding | QCELP |
| SprintMcdVersion | 1.1 |
| PictureMailSupport | Yes |
| VideoMailSupport | Yes |
| MobileOriginatedSmsSupport | Yes |
| FotaProtocolVersion | 1.1 |
| FotaClientVersion | 2.0 |
| FotaClientVendor | Samsung |
| DiagnosticsProtocolVersion | |
| DiagnosticsClientVersion | |
| DiagnosticsClientVendor | |

APPENDIX B

Sample Header

| APPENDIX B |
|---|
| Sample Header |
| Accept===application/vnd.wap.wmlc;Q=0.5, application/vnd.wap.wmlscriptc;Q=0.5, text/html;Q=0.5, text/css, application/xhtml+xml, application/vnd.wap.xhtml+xml, application/vnd.wap.multipart.related, application/vnd.wap.multipart.mixed, multipart/mixed, application/vnd.wap.sic, application/vnd.oma.drm.message, application/vnd.phonecom.mmc-wbxml, application/m otorola-mmstemplate, image/gif, image/bmp, image/vnd.wap.wbmp, image/png, image/jpeg, image/ems.userdefined.picture, image/ems.userdefined.animation, image/ems.predefined.animation, au dio/bas, audio/imelody, audio/mid, audio/midi, audio/mp3, audio/mpeg, audio/mpeg3, audio/mpg, audio/x-mp3, audio/x-mpeg, audio/x-mpeg3, audio/x-mpg, audio/x-wav, audio/wav, audio/amr, audio/3gpp, video/mp4, video/3gpp, application/mtf, appl<br>    Accept===*/*<br>    Cache-Control===max-age=259200<br>    Connection===keep-alive<br>    Content-Language===en-US<br>    Content-Length===0<br>    Cookie===B=2bsapdp13vvpo&b=2&f=mobile;Y=v=1&n=fon3341132k2e&pT=z=0<br>    Host===test.oa.yahoo.com<br>    User-Agent===Y!PHOTOS J2ME MIDP/CLDC1.0 MOT-V220 V1.3<br>    Via===1.0 proxy.india.aalayance.com:3128 (squid/2.5.STABLE8)<br>    X-Forwarded-For===unknown<br>    y-app-agent===Y!PHOTOS J2ME MIDP/CLDC1.0 MOT-V220 V1.3<br>    y-build-date===0503031050t<br>    y-client-id===1105590242__14083064621uscingular |

What is claimed as new and desired to be protected by Letters Patent of the United States is:

1. A method for providing relevant, non-requested content by a server device to a mobile device, comprising:
   determining, by the server device, a mobile user profile from characteristics of a mobile terminal and from tracked usage of the mobile terminal by a user to request content through an online portal and from mobile consumer information communicated to the user with the mobile terminal and third-party information received through an out-of-band communication other than the mobile device, wherein the third-party information is based on a plurality of detected user actions with the mobile device, including actions between third parties and the user;
   updating, by the server device, the mobile user profile based on the third-party information and a result of at least one independent test of at least one provided characteristic of the mobile terminal used by the user and other information that is based on at least one of a communication header and an analysis of communication performance for the mobile device;
   determining, by the server device, at least one condition that the user most often uses the mobile terminal at one or more times based on at least one provided characteristic of the mobile terminal and the other information;
   comparing, by the server device, mobile purchase information from the mobile consumer information for the user to general consumer information in a general user profile for the user that requests content through the online portal, wherein at least a result of the comparison is employed to determine at least one mobile purchasing habit of the user through the mobile terminal;
   using the updated mobile user profile and the at least one determined mobile purchasing habit to determine, by the server device, non-requested content and to determine a trigger at which to access the non-requested content; and
   communicating, by the server device, the non-requested content to the mobile terminal at the determined trigger.

2. The method of claim 1, further comprising using the general user profile to further determine the non-requested content, wherein the general user profile includes information from tracked usage of an alternate electronic device to access content through the online portal, wherein the alternate electronic device is in communication with the online portal and is associated with the mobile terminal.

3. The method of claim 1, wherein the characteristics of the mobile terminal are determined at least in part from at least one of the following:
   a standardized mobile terminal profile; and
   independent testing of the mobile terminal.

4. The method of claim 1, wherein the online portal provides content related to more than one topic.

5. The method of claim 1, wherein the non-requested content comprises at least one of the following:
   an advertisement;
   a notice of an event related to the requested content; and
   content from the same source as the requested content.

6. The method of claim 1, wherein determining the mobile user profile comprises:
   accessing a predefined mobile terminal profile that describes the characteristics of the mobile terminal;
   determining a pattern of mobile usage from the tracked usage of the mobile terminal by the user to access content; and
   associating the mobile terminal profile with the pattern.

7. The method of claim 6, wherein the pattern comprises a purchasing pattern.

8. The method of claim 1, wherein using the mobile user profile comprises:
   accessing the mobile user profile for usage information including at least one of the following:
      a time that the mobile terminal accessed the requested content;
      a location from which the mobile terminal accessed the requested content; and
      a frequency with which the mobile terminal accessed the requested content; and
   searching for content that is related to the requested content and the usage information.

9. The method of claim 1, wherein the mobile user profile includes characteristics of a previously used mobile terminal associated with the user.

10. The method of claim 1, wherein the trigger comprises at least one of the following:
   detecting that the mobile terminal is near a location at which the mobile terminal previously accessed the requested content;
   detecting a time near which the mobile terminal previously accessed the requested content; and
   detecting a communication from the mobile terminal that is substantially equivalent to a previous communication that was followed by the mobile terminal accessing the requested content.

11. A non-transitory computer readable storage medium, comprising instructions executed by a processor for performing actions to provide relevant, non-requested content to a mobile device, including:
   determining, by the processor, a mobile user profile from characteristics of a mobile terminal and from tracked usage of the mobile terminal by a user to request content through an online portal and from mobile consumer information communicated to the user with the mobile terminal and third-party information received through an out-of-band communication other than the mobile device, wherein the third-party information is based on a plurality of detected user actions with the mobile device, including actions between third parties and the user;
   updating, by the processor, the mobile user profile based on the third-party information and a result of at least one independent test of at least one provided characteristic of the mobile terminal used by the user and other information that is based on at least one of a communication header and an analysis of communication performance for the mobile device;
   determining, by the processor, at least one condition that the user most often uses the mobile terminal at one or more times based on at least one provided characteristic of the mobile terminal and the other information;
   comparing, by the processor, mobile purchase information from the mobile consumer information for the user to general consumer information in a general user profile for the user that requests content through the online portal, wherein at least a result of the comparison is employed to determine at least one mobile purchasing habit of the user through the mobile terminal;
   using the updated mobile user profile and the at least one determined mobile purchasing habit to determine, by the processor, non-requested content and to determine a trigger at which to access the non-requested content; and
   communicating, by the processor, the non-requested content to the mobile terminal at the determined trigger.

12. A non-transitory computer readable storage medium comprising instructions executed by a processor for communicating content over a network, which when executed cause a computing device to:
   determine, by the processor, a mobile user profile from characteristics of a mobile terminal and from tracked usage of the mobile terminal by a user to request content through an online portal and from mobile consumer information communicated to the user with the mobile terminal and third-party information received through an out-of-band communication other than the mobile device, wherein the third-party information is based on a plurality of detected user actions with the mobile device, including actions between third parties and the user;
   update, by the processor, the mobile user profile based on the third-party information and a result of at least one independent test of at least one provided characteristic of the mobile terminal used by the user and other information that is based on at least one of a communication header and an analysis of communication performance for the mobile device;
   determine, by the processor, at least one condition that the user most often uses the mobile terminal at one or more times based on at least one provided characteristic of the mobile terminal and the other information;
   compare, by the processor, mobile purchase information from the mobile consumer information for the user to general consumer information in a general user profile for the user that requests content through the online portal, wherein at least a result of the comparison is employed to determine at least one mobile purchasing habit of the user through the mobile terminal;
   use the updated mobile user profile and the at least one determined mobile purchasing habit to determine, by the processor, non-requested content, to determine a frequency for communicating the non-requested content to the mobile terminal, and to determine a trigger at which to access the non-requested content; and
   communicate, by the processor, the non-requested content to the mobile terminal at the determined trigger and at the determined frequency.

13. A system for providing relevant, non-requested content to a mobile device, comprising:
   a processor;
   a communication interface in communication with the processor and a mobile terminal; and
   a memory in communication with the processor and storing machine instructions that cause the processor to perform a plurality of operations, including:
      determining a mobile user profile from characteristics of a mobile terminal and from tracked usage of the mobile terminal by a user to request content through an online portal and from mobile consumer information communicated to the user with the mobile terminal and third-party information received through an out-of-band communication other than the mobile device, wherein the third-party information is based on a plurality of detected user actions with the mobile device, including actions between third parties and the user;
      updating the mobile user profile based on the third-party information and a result of at least one independent test of at least one provided characteristic of the mobile terminal used by the user and other information that is based on at least one of a communication header and an analysis of communication performance for the mobile device;
      determining at least one condition that the user most often uses the mobile terminal at one or more times based on at least one provided characteristic of the mobile terminal and the other information;
      comparing mobile purchase information from the mobile consumer information for the user to general consumer information in a general user profile for the user that requests content through the online portal, wherein at least a result of the comparison in employed to determine at least one mobile purchasing habit of the user through the mobile terminal;
      using the updated mobile user profile and the at least one determined mobile purchasing habit to determine non-requested content and to determine a trigger at which to access the non-requested content; and
      communicating the non-requested content to the mobile terminal at the determined trigger.

14. The system of claim 13, wherein the system comprises an online portal server.

15. The system of claim 13, wherein the machine instructions cause the processor to further perform the operation of using the general user profile to further determine the non-requested content, wherein the general user profile includes information from tracked usage of an alternate electronic device to access content through the system, wherein the alternate electronic device is in communication with the communication interface and is associated with the mobile terminal.

16. The system of claim 13, wherein the machine instructions cause the processor to determine the mobile user profile by further performing the operations of:
   accessing a predefined mobile terminal profile that describes the characteristics of the mobile terminal,
   determining a pattern of mobile usage from the tracked usage of the mobile terminal by the user to access content; and
   associating the mobile terminal profile with the pattern.

17. The system of claim 13, wherein the machine instructions cause the processor to use the mobile user profile by further performing the operations of:
   accessing the mobile user profile for usage information including at least one of the following:
      a time that the mobile terminal accessed the requested content;
      a location from which the mobile terminal accessed the requested content; and
      a frequency with which the mobile terminal accessed the requested content; and
   searching for non-requested content that is related to the requested content and the usage information.

18. The system of claim 13, wherein the mobile user profile includes characteristics of a previously used mobile terminal associated with the user.

19. A mobile device for receiving non-requested content, comprising:
   a processor;
   a communication interface in communication with the processor and an online portal; and
   a memory in communication with the processor and storing machine instructions that cause the processor to perform a plurality of operations, including:
      communicating an identifier of a mobile terminal to the online portal to enable the online portal to initiate a mobile user profile from characteristics of the mobile terminal and from mobile consumer information communicated to a user with the mobile terminal and third-party information received through an out-of-band communication other than the mobile device, wherein the third-party information is based on a plurality of detected user actions with the mobile device, including actions between third parties and the user;
      updating the mobile user profile based on the third-party information and a result of at least one independent test of at least one provided characteristic of the mobile terminal used by the user and other information that is based on at least one of a communication header and an analysis of communication performance for the mobile device;
      determining at least one condition that the user most often uses the mobile terminal at one or more times based on at least one provided characteristic of the mobile terminal and the other information;
      requesting content through the online portal, enabling the online portal to track requested content and revise the mobile user profile based on the requested content;
      receiving non-requested content from the online portal, wherein the non-requested content is related to the requested content and the non-requested content is determined based on the updated mobile user profile, wherein the non-requested content is received upon a trigger related to the requested content, and wherein the non-requested content is further based on at least one mobile purchasing habit of the user through the mobile terminal, determined based at least on a result of a comparison of mobile purchase information from the mobile consumer information for the user to general consumer information in a general user profile for the user that requests content through the online portal.

20. The mobile device of claim 19, wherein the mobile terminal comprises a second mobile terminal associated with the mobile user profile and the mobile user profile includes characteristics of a previously used mobile terminal associated with the user.

* * * * *